United States Patent [19]

Conrow

[11] Patent Number: 5,656,866

[45] Date of Patent: Aug. 12, 1997

[54] VEHICLE IGNITION-DISABLING ANTI-CAR JACKING DEVICE

[76] Inventor: Tom Conrow, 14478 Roger Torres, El Paso, Tex. 79938

[21] Appl. No.: 562,053

[22] Filed: Nov. 22, 1995

[51] Int. Cl.⁶ .................................................. B60R 25/04
[52] U.S. Cl. ......................... 307/10.3; 180/287; 340/426
[58] Field of Search .................................. 307/10.1–10.6; 180/287; 123/198 DC, 198 DB; 340/425.5, 426, 430, 428, 825.3–825.32, 825.34, 825.69, 825.72

[56] References Cited

U.S. PATENT DOCUMENTS

| | | | |
|---|---|---|---|
| 4,507,644 | 3/1985 | Abrahamson | 307/10.2 |
| 5,307,048 | 4/1994 | Sonders | 307/10.2 |
| 5,315,286 | 5/1994 | Nolan | 180/287 |
| 5,412,370 | 5/1995 | Berman et al. | 307/10.2 |
| 5,477,206 | 12/1995 | Rodriguez, Sr. | 307/10.2 |

*Primary Examiner*—Richard T. Elms

[57] ABSTRACT

An ignition coil operatively coupled with an engine and an electronic ignition system coupled to an electric power supply and activated by a key, the ignition-disabling anti-car jacking device including a relay mechanism coupled between the ignition coil and the ignition system of the vehicle and with the relay mechanism being enabled for energizing the ignition coil when the ignition system is activated with the key and further being disabled for de-energizing the ignition coil when the ignition system is deactivated with the key; a first timer mechanism for transmitting a first switching signal after a first predetermined period of time; a second timer mechanism for transmitting a second switching signal after a second predetermined period of time; a first switching mechanism coupled between the first timer mechanism and the second timer mechanism and responsive to receipt of the first switching signal from the first timer mechanism for activating the second timer mechanism; a second switching mechanism coupled between the second timer mechanism and the relay mechanism and being responsive to the receipt of the second switching signal for disabling the relay mechanism and further, enabling the relay mechanism when the second switching signal is not received; and a manually-operated third switching mechanism being responsive to a manual application of an external grounding contact applied thereto by a driver of the vehicle for deactivating the timer mechanisms and thereby precluding the relay mechanism from being disabled.

1 Claim, 3 Drawing Sheets

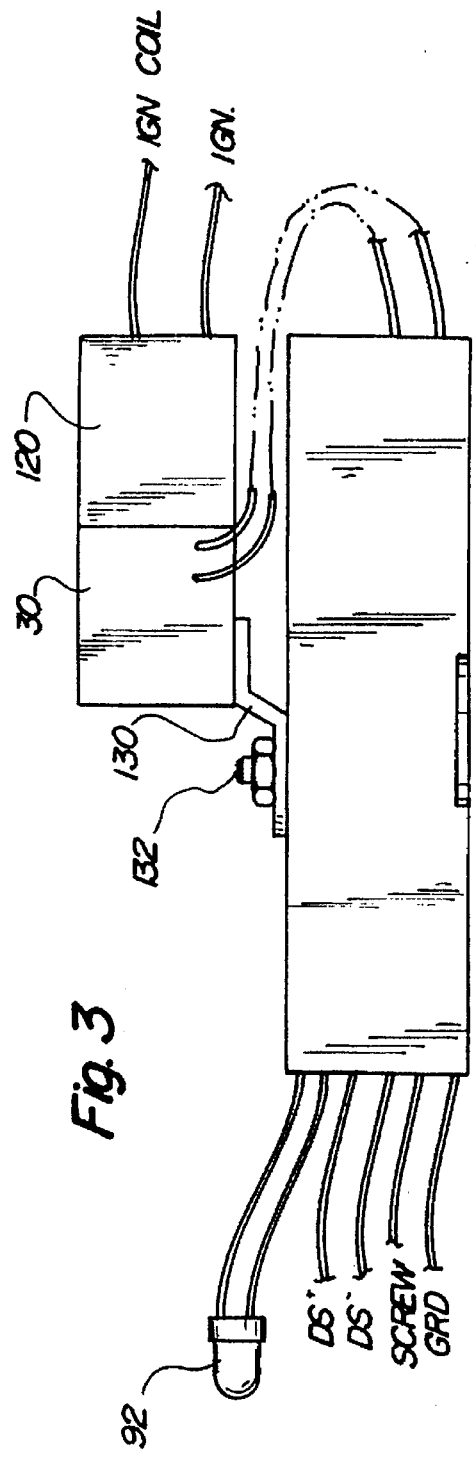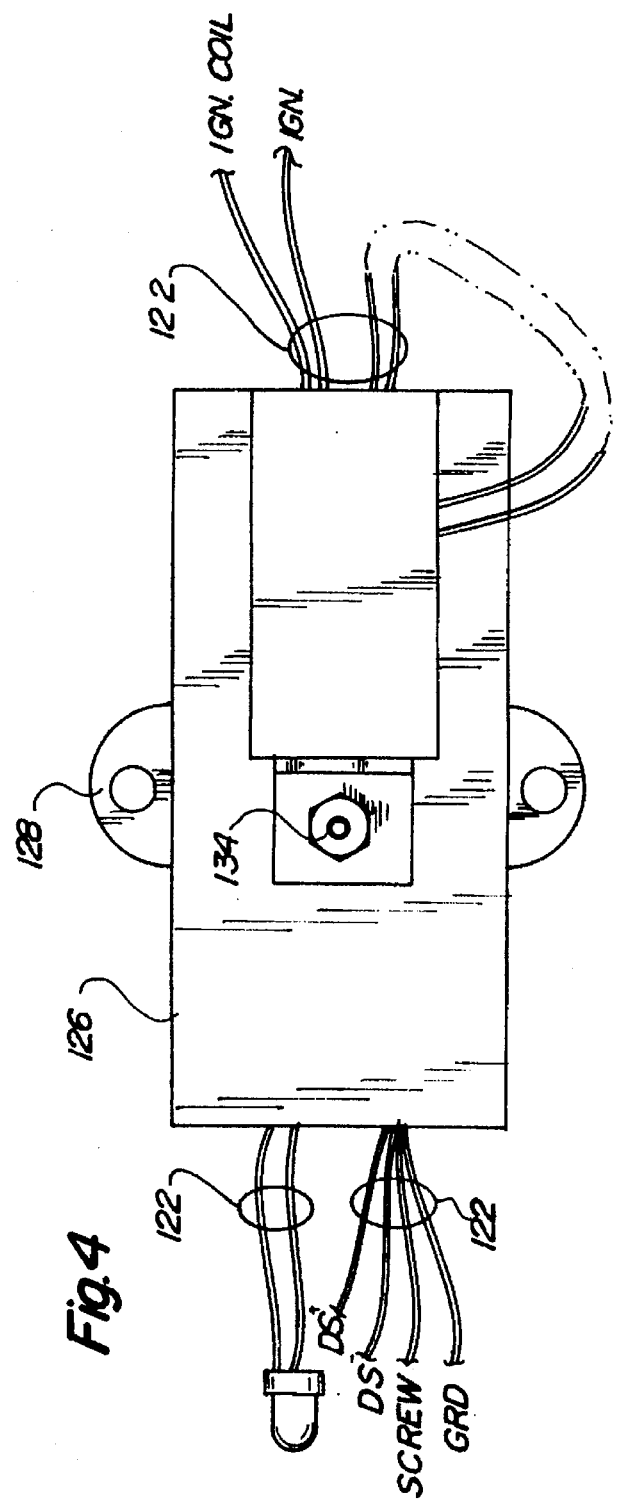

VEHICLE IGNITION-DISABLING ANTI-CAR JACKING DEVICE

BACKGROUND OF THE INVENTION

1. Field of the Invention

The present invention relates to a vehicle ignition-disabling anti-car jacking device and more particularly pertains to disabling an electronic ignition system of a vehicle and thereby preventing unauthorized operation of such vehicle with a vehicle ignition-disabling anti-car jacking device.

2. Description of the Prior Art

The use of vehicle anti-theft and anti-car jacking devices is known in the prior art. More specifically, vehicle anti-theft and anti-car jacking devices heretofore devised and utilized for the purpose of preventing unauthorized operation or theft of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,992,670 to Pastor discloses an ignition disabling anti-theft device. U.S. Pat. No. 5,132,660 to Chen et al. discloses a vehicle security system. U.S. Pat. No. 5,172,094 to Stadler discloses an automatically armed vehicle anti-theft system. U.S. Pat. No. 5,307,048 to Sonders discloses a vehicle security system including an anti-car jacking system. U.S. Pat. No. 5,318,147 to Maiefski discloses an anti-car jacking system.

While these devices fulfill their respective, particular objective and requirements, the aforementioned patents do not describe a vehicle ignition-disabling anti-car jacking device that allows a vehicle's ignition system to be disabled in the event that an external grounding contact has not applied by an authorized driver.

In this respect, the vehicle ignition-disabling anti-car jacking device according to the present invention substantially departs from the conventional concepts and designs of the prior art, and in doing so provides an apparatus primarily developed for the purpose of disabling an electronic ignition system of a vehicle and thereby preventing unauthorized operation of such vehicle.

Therefore, it can be appreciated that there exists a continuing need for a new and improved vehicle ignition-disabling anti-car jacking device which can be used for disabling an electronic ignition system of a vehicle and thereby preventing unauthorized operation of such vehicle. In this regard, the present invention substantially fulfills this need.

SUMMARY OF THE INVENTION

In the view of the foregoing disadvantages inherent in the known types of vehicle anti-theft and anti-car jacking devices now present in the prior art, the present invention provides an improved vehicle ignition-disabling anti-car jacking device. As such, the general purpose of the present invention, which will be described subsequently in greater detail, is to provide a new and improved vehicle ignition-disabling anti-car jacking device and method which has all the advantages of the prior art and none of the disadvantages.

To attain this, the present invention essentially comprises, in combination, a relay mechanism. The relay mechanism is coupled between the ignition coil and the ignition system of the vehicle. The relay mechanism is enabled and thus electrically energizes the ignition coil when the ignition system is activated with the key. A first timer mechanism is included. The first timer mechanism is used for transmitting an electric first switching signal after a first predetermined period of time when electrically activated by the key. A second timer mechanism is also included and is used for transmitting an electric second switching signal after a second predetermined period of time.

A first switching mechanism is provided and coupled between the first timer mechanism and the second timer mechanism. The first switching mechanism is responsive to receipt of the first switching signal from the first timer mechanism for electrically activating the second timer mechanism. A second switching mechanism is also provided and coupled between the second timer mechanism and the relay mechanism. The second switching mechanism is responsive to the receipt of the second switching signal from the second timer mechanism for disabling the relay mechanism. In addition, a manually-operated third switching mechanism is coupled to the relay mechanism, the first timer mechanism, and the second timer mechanism. The third switching mechanism is activated in response to a manual application of an external grounding contact applied thereto by a driver of the vehicle for deactivating the first timer mechanism and the second timer mechanism and thereby precluding the relay mechanism from being disabled.

A lamp mechanism is provided and coupled to the third switching mechanism and the indicator panel of the vehicle. The lamp mechanism provides a visual indication that the third switching mechanism has been activated. An alarm mechanism is also provided and coupled between first timer mechanism and the first switching mechanism. The alarm mechanism is activated in response to receipt of the first switching signal from the first timer mechanism and provides an audible warning prior to activation of the second timer mechanism and subsequent disabling of the relay mechanism. Lastly, a door switch interface mechanism coupled to the first timer mechanism, the second timer mechanism, and the third switching mechanism. The door switch interface mechanism is securable to the door switch on the driver's door of the vehicle. The door switch interface mechanism is activated in responsive to opening of the driver's door for disabling the third switching mechanism and thereby allowing the relay mechanism to be disabled (in about 40 seconds).

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle ignition-disabling anti-car jacking device which has all the advantages of the prior art vehicle anti-theft and anti-car jacking devices and none of the disadvantages.

It is another object of the present invention to provide a new and improved vehicle ignition-disabling anti-car jacking device which may be easily and efficiently manufactured and marketed.

It is a further object of the present invention to provide a new and improved vehicle ignition-disabling anti-car jacking device which is of durable and reliable construction.

An even further object of the present invention is to provide a new and improved vehicle ignition-disabling anti-car jacking device which is susceptible of a low cost of manufacture with regard to both materials and labor, and which accordingly is then susceptible of low prices of sale to the consuming public, thereby making such a vehicle ignition-disabling anti-car jacking device economically available to the buying public.

Still yet another object of the present invention is to provide a new and improved vehicle ignition-disabling anti-car jacking device which provides in the apparatuses and methods of the prior art some of the advantages thereof, while simultaneously overcoming some of the disadvantages normally associated therewith.

Even still another object of the present invention is to provide a new and improved vehicle ignition-disabling anti-car jacking device for disabling an electronic ignition system of a vehicle and thereby preventing unauthorized operation of such vehicle.

Lastly, it is an object of the present invention to provide a new and improved vehicle ignition-disabling anti-car jacking device comprising a relay mechanism coupled between the ignition coil and the ignition system of the vehicle, the relay mechanism being enabled for electrically energizing the ignition coil when the ignition system is activated with the key; a first timer mechanism for transmitting a first switching signal after a first predetermined period of time; a second timer mechanism for transmitting a second switching signal after a second predetermined period of time; a first switching mechanism coupled between the first timer mechanism and the second timer mechanism and responsive to receipt of the first switching signal from the first timer mechanism for activating the second timer mechanism; a second switching mechanism coupled between the second timer mechanism and the relay mechanism, the second switching mechanism being responsive to the receipt of the second switching signal from the second timer mechanism for disabling the relay mechanism; and a manually-operated third switching mechanism coupled to the relay mechanism, the first timer mechanism, and the second timer mechanism, the third switching mechanism being activated in responsive to a manual application of an external grounding contact applied thereto by a driver of the vehicle for deactivating the first timer mechanism and the second timer mechanism and thereby precluding the relay mechanism from being disabled.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side-elevational view of the housing that is used for securing the present invention to a vehicle.

FIG. 4 is a plan view of the preferred embodiment of the present invention.

The same reference numerals refer to the same parts through the various Figures.

DESCRIPTION OF THE PREFERRED EMBODIMENT

With reference now to the drawings, the preferred embodiment of the new and improved vehicle ignition-disabling anti-car jacking device embodying the principles and concepts of the present invention will be described.

Figure 1:
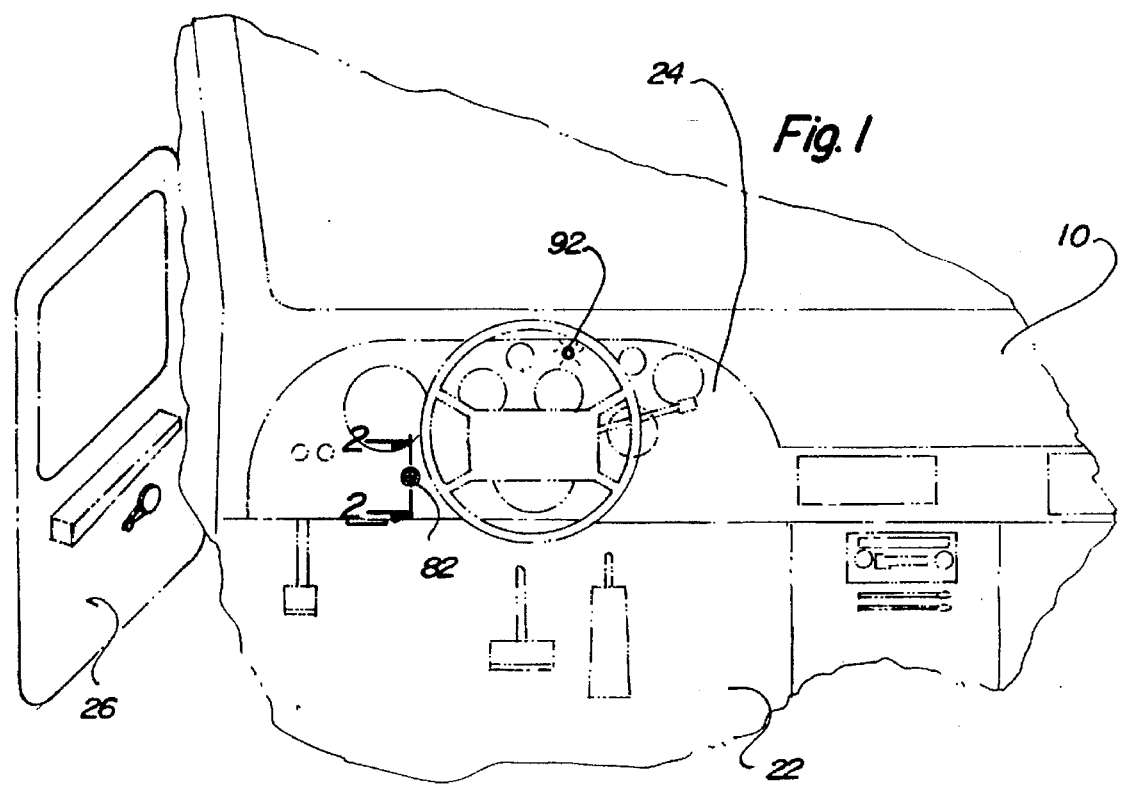
FIG. 1 is a side-elevational view of a portion of the present invention extended within a driver's compartment of a vehicle for allowing its control and monitoring.
Figure 5:
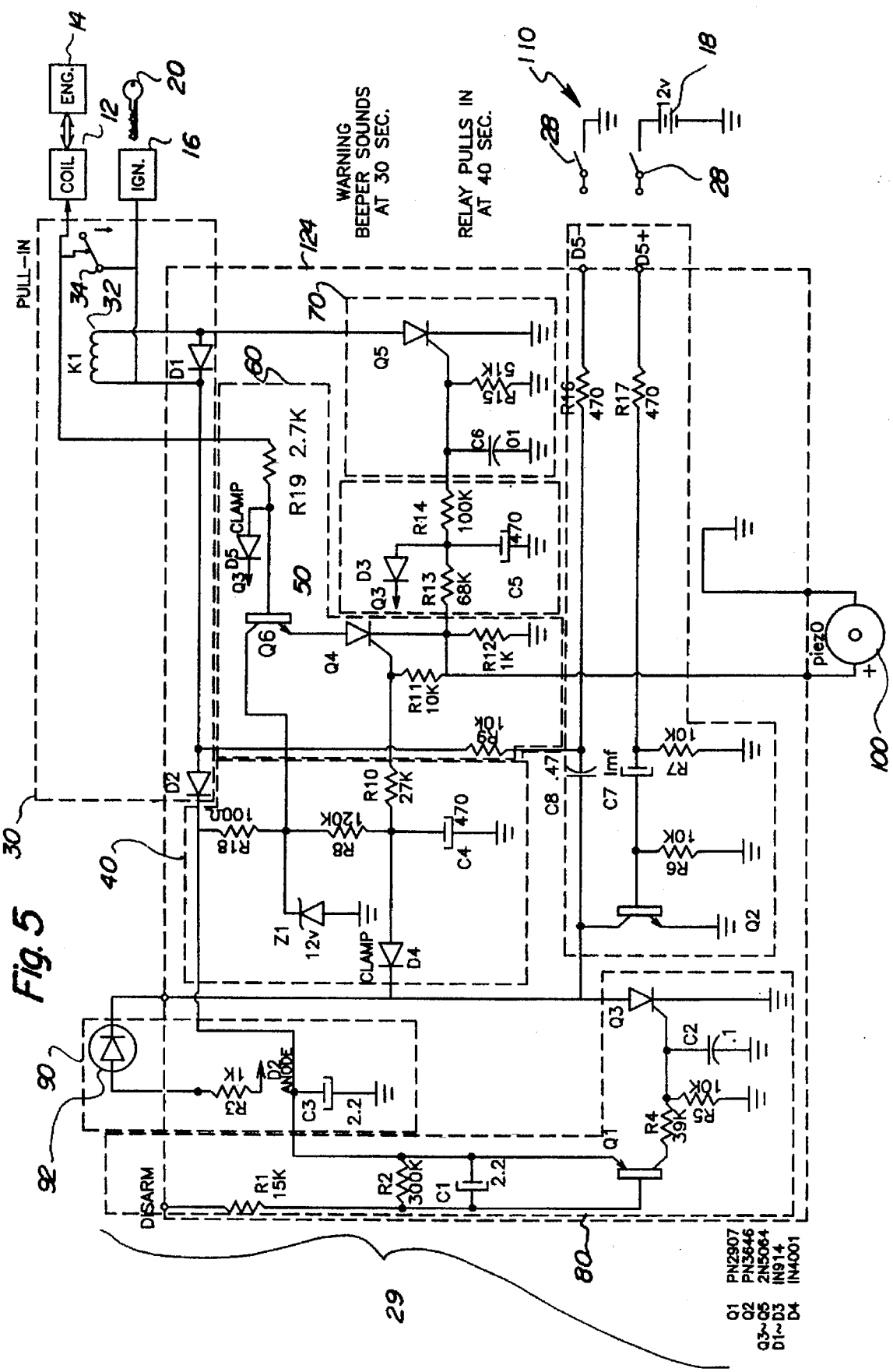
FIG. 5 is a schematic diagram of the present invention and its interconnection with associated components of a vehicle.

The present invention is adapted for use with a vehicle 10 such as a car or truck. As shown in FIG. 5, the vehicle has an ignition coil 12 that is operatively coupled with its engine 14. The engine is actuated through an electronic ignition system 16 that is coupled to an electric power supply 18 such as a battery or alternator. The ignition system 16 is actuated by a hand-held removable key 20 or other functionally equivalent keying device. The removable key 20 forms a stable ground when inserted within the electronic ignition system of the vehicle. Furthermore, as shown in FIG. 1, the vehicle also has a passenger compartment 22 with an associated indicator panel 24. The indicator panel includes monitoring gauges that allow a driver to monitor the status of vehicle operations. A driver's door 26 is provided and allows the driver access to the passenger compartment.

In addition, an electrically-energized and openable electronic driver's door switch 28 is coupled to the driver's door 26. The door switch is responsive to opening and closing of the driver's door 26. The door switch 28 is formed of a conventional pin switch that is readily and commercially available. As shown in FIG. 5, one type of pin switch provides a grounded output when closed. Another type of pin switch provides a high output when closed. The type of pin switch used is dependent on the type of vehicle with which the present invention 29 is to be utilized.

The present invention 29 is used for disabling the ignition system 16 of the vehicle and thereby preventing its unauthorized operation. The present invention is especially effective in rendering a vehicle inoperable to preclude its being car jacked. As shown in FIG. 5, the present invention is embodied in an electric circuit that includes a relay mechanism 30. The relay mechanism is formed of a conventional single pole single throw relay K1 coupled to and in electrical communication with commercially available IN914 stabilizing diode D1. Relay K1 has a pair of normally closed relay contacts 34. The switching contacts of relay K1 are coupled between the ignition coil 12 and the ignition system 16 of the vehicle 10. The relay mechanism 30 is enabled for electrically energizing the ignition coil 12 when the ignition system is actuated with the key 16 and when the relay contacts 34 are closed. Relay K1 is disabled and de-energizes the ignition coil 12 when the relay contacts 34 are opened. When the relay K1 is enabled, electrical power may be delivered to the coil 12.

The present invention includes a first timer mechanism The first timer mechanism is formed of a series interconnection of resistors R8 and R18 that are coupled to a charging capacitor C4. An input power regulator formed of a Zener diode Z1 is also provided and coupled between resistors R8 and R18 and ground. The Zener diode ensures that a constant 12 volt power input is applied to the charging capacitor C4. Also provided as part of the timer mechanism 40 is an output resistor R10 and a commercially available IN4001 discharge enabling diode D4 that are connected to capacitor C4. The timer mechanism 40 transmits an electric first switching signal after a first predetermined period of time when it is electrically activated by the ignition switch mechanism 30. The first switching signal is effectively rendered when the capacitor C4 is charged to a given level through resistor R8. The time required to charge capacitor C4 to the desired level is about 30 seconds. This charging time will be referred to as the first predetermined time period.

Also provided is a second timer mechanism 50. The second timer mechanism is formed of a resistor R13 interconnected with a charging capacitor C5. In addition, the second timer mechanism 50 has an output resistor R14 and a commercially available IN914 discharge enabling diode D3 connected to capacitor C5. The second timer mechanism transmits an electric second switching signal after a second predetermined period of time. The second switching signal is effectively rendered when the capacitor C5 is charged to a given level through resistor R13. Preferably, the time required to charge capacitor C5 to the desired level is about 10 seconds. This charging time will be referred to as the second predetermined time period. Both the first and the second predetermined time periods can be modified through use of different internally resistive and capacitive elements based on a desired response time.

Operatively coupled between the first timer mechanism 40 and the second timer mechanism 50 is a first switching mechanism 60. The first switching mechanism includes a commercially available 2N5064 silicon-controlled rectifier (SCR) Q4. SCR Q4 is biased by a resistive network formed of resistors R9, R11, and R12. The first switching means 60 is responsive to receipt of the first switching signal from the first timer mechanism 40 for electrically activating the second timer mechanism 50. Thus, after the first predetermined time of 30 seconds, the first switching mechanism 60 activates the second timer mechanism 50, thereby allowing the second switching signal to be generated after a period of about 10 seconds.

Next, coupled between the second timer mechanism 50 and the relay mechanism 30 is a second switching mechanism 70. The second switching mechanism is formed of a commercially available 2N5064 SCR Q5 and a stabilization network formed of capacitor C6 and resistor R15. The second switching means is responsive to the receipt of the second switching signal from the second timer mechanism for disabling the relay mechanism 30 to thereby prevent electrical energy from being delivered to the coil 12. The time from the initiation of the first switching signal to the disabling of the relay mechanism 30 is about 10 seconds. The second switching mechanism 70 will also continue enabling of the relay mechanism 30 when the second switching signal is not received from the second timer mechanism 50. If the second switching signal is not received, electrical energy can be delivered from the ignition system 16 to the coil 12 through the relay K1 of the relay mechanism.

Figure 2:
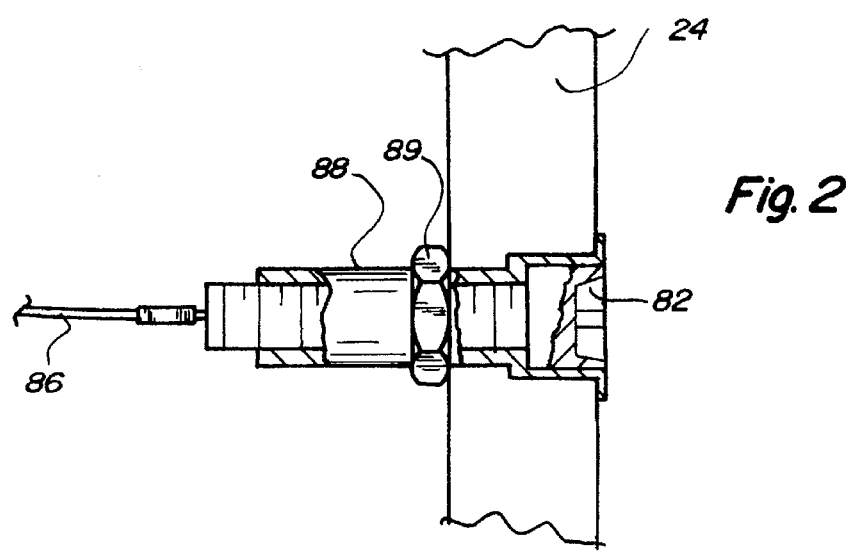
FIG. 2 is a fragmentary cross-sectional view of the grounding contact point that allows disabling of the present invention as taken along the line 2—2 of FIG. 1.

A manually-operated third switching mechanism 80 is also provided and coupled to the relay mechanism 30, the first timer mechanism 40, and the second timer mechanism 50. The third switching mechanism includes a conventional 2N5064 SCR Q3 and an associated stabilization network formed of capacitor C2 and resistor R5, which is biased by a commercially available PN2907 PNP transistor Q1. A level resistor R4 is also included and coupled between SCR Q3 and transistor Q1 to provide a compatible input. Furthermore, the third switching means includes a resistor R1 coupled to the base of transistor Q1 and a parallel connection of resistor R2 and shunt capacitor C1 coupled to the emitter of transistor Q1. The third switching mechanism 80 is activated in response to a manual application of an external grounding contact applied thereto via resistor R1 for deactivating the first timer mechanism 40 and the second timer mechanism 60. Such a manual application of grounding contact is applied by a finger on the hand of the driver with a screw 82 as shown in FIGS. 1 and 2, in conjunction with grounding contact applied by the driver's other hand with the key 20 as it is engaged with ignition key. Screw 82 is connected to resistor R1 in FIG. 5. Screw 82 is extended through the indicator panel 24 and coupled to a remaining portion of the third switching mechanism 80 through use of a line 86. In addition, screw 82 is secured to the control panel through use of an outwardly threaded sleeve 88 engaged with a nut 89. By deactivating the first timer mechanism and the second timer mechanism through application of grounding contact by the driver, the device 29 is effectively disarmed. Otherwise, when the grounding contact is not applied, the device 29 is effectively armed when energized. It should be understood that resistor R1 is absolutely necessary to the function of transistor Q1. In some installations, a hidden grounding or valet switch might be connected at the disarm screw 82. If the resistor R1 is omitted, transistor Q1 will be destroyed when a direct ground is placed on the screw.

A lamp mechanism 90 is coupled to the third switching mechanism 80 at SCR Q3. The lamp mechanism is formed of a commercially available green light emitting diode in a series interconnection with resistor R3. The light emitting diode 92 of the lamp mechanism is extended through the indicator panel 24 of the vehicle. The lamp mechanism provides a visual warning that the third switching means has been activated, thereby designating that the device 29 has been disarmed.

In addition, a piezoelectric buzzer or warning beeper 100 is coupled between the first timer mechanism 40 and the first switching mechanism 60. The buzzer 100 provides a beeping sound when activated in response to receipt of the first switching signal from the first timer mechanism 40. The buzzer 100 provides an audible alarm or warning to a driver prior to activation of the second switch mechanism and subsequent disabling of the relay mechanism 30. Thus, upon hearing the alarm, the driver can apply a grounding contact to the third switching mechanism 80 by touching screw 82 and simultaneously contacting engaged key 20 to thereby disable the present invention 29 and allow continued operation of the vehicle. Provision is made for a user to shut off the warning beeper 100, if it should be necessary to disarm while driving. To accomplish this, transistor Q6 of the first switch mechanism 60 is added as the shut-off transistor, receiving forward bias through R19. When the present invention is disarmed, diode D5 and SCR Q3 effectively short this forward bias to ground, shutting of SCR Q4 and the beeper 100. If a carjacker should run out of time, and the vehicle is shut off, so does the beeper, as resistor R19 connects to the same relay contact as does the vehicle coil 16. The beeper will therefore be more difficult to find if the carjacker were to try to find it.

As a further enhancement to the present invention, a door switch interface mechanism 110 is coupled to the first timer mechanism 40, the second timer mechanism 50, and the third switching mechanism 80 and is further secured to a door switch 28 on the driver's door of the vehicle. The door switch interface mechanism is formed of a conventional PN3646 transistor Q2 whose collector is connected across SCR Q3 and whose base is coupled to a network formed of an interconnection of blocking capacitor C7, and resistors R6, R7, and R17. The door switch interface mechanism is activated in response to opening of the driver's side door to thereby disable the third switching mechanism by diverting current around the SCR Q3 and through transistor Q2. Thus, the door switch interface mechanism 110 allows the relay mechanism 30 to be enabled.

Initially, in operation, all the electrical components of the present invention 29 are de-energized. When ignition is turned on, electrical power is applied to relay K1 and the rest of the circuit. The coil 32 receives power through the normally closed relay contacts of relay K1, and the engine of the vehicle can be started. Upon energizing of the system, it is effectively armed. Initially, upon electrical energization, capacitor C4 starts to charge through resistor R8. In about 30 seconds (i.e., the first predetermined time), voltage on capacitor C4 is sufficient to fire SCR Q4 with gate drive through resistor R10. Note that SCR Q4 is connected as a follower, with the load in the cathode circuit. When SCR Q4 fires, its cathode immediately goes to about 12 volts, activating the warning beeper 100 and initiating a charge on capacitor C5 through resistor R13. In about ten seconds after the warning beeper is initiated (i.e., the second predetermined time), SCR Q5 receives enough gate drive to fire, and thus pulls in relay K1. The contacts of relay K1 are now open, killing the engine of the vehicle. Diode D1 across the coil 32 of relay K1 is necessary to suppress the current spike that occurs when relay K1 is de-energized.

To disarm the present invention, contact with an external grounding contact is made by the driver as vehicle is started. The grounding contact consists of a driver's contact by hand with an interface screw 82 and the ignition key 20 (when this key is inserted into the ignition system 16 to thereby form a good ground). Transistor Q1 inverter delivers positive drive to the SCR Q3 gate, through resistor R4. SCR Q3 fires immediately, completing circuit for the green light emitting diode 92. With the anode of SCR Q3 at nearly ground, any charge on capacitor C4 is shorted through diode D4 and SCR Q3. Also capacitor C5 is similarly shunted by diode D3 and SCR Q3. Now the light emitting diode 92 verifies that SCR Q4 cannot fire. As this is an anti-car jacking device, provision is made to automatically rearm the system when driver's door is opened. To accomplish this, one of the two door-switch lines DS− or DS+ would be used. If vehicle uses grounding DS−, connection with the applicable door switch 28 is made at resistor R16. Opening the driver's door thus momentarily shunts enough operating current around SCR Q3 to shut it off. If vehicle door-switch goes positive when opened, connection is made to resistor R17. In this case, NPN transistor Q2 is momentarily pulsed on through resistor R17 and capacitor C7. Transistor Q2 then shunts operating current around SCR Q3, to shut it off. As SCR Q3 shuts off, the cathodes of clamp diode D3 and D4 suddenly go to 12 volts or more, so that they are effectively out of the circuit, allowing capacitor C4 and capacitor C5 to charge.

Resistors R5, R11, and R15 are gate return resistors for their respective SCRs, and are necessary for stable SCR operation. Resistors R6, R7, and R9 are necessary to allow capacitors C7 and C8 to discharge again after being pulsed. Resistor R2 and capacitor C1 are necessary to stabilize transistor Q1. Diode D2 and capacitor C3 prevent immediate restarting, once relay has pulled in; In such a case, if key was turned off, and back on again, as an attempt to re-start, relay K1 will immediately pull in again when power is applied. Disarming the unit 29 after it has timed out will require contacting the screw 82 with the ignition 16 on, and maintaining contact with key 20 as the ignition is turned off, and back on again. This is so because an SCR cannot he turned off by removing gate drive. It is necessary, in that case, to first discharge capacitors C4 and C5. Otherwise, when electric power is again returned with the ignition switch, the SCRs will immediately fire again, as previously described. The basic reason for the warning beeper 100 is for the protection of the driver of the vehicle, who may forget to disarm the unit when starting. As always, in order for transistor Q1 to conduct, contact with the screw and the key is required to form a good grounding contact.

As best illustrated in FIG. 3, relay mechanism 30 interfaces with the ignition coil and ignition of the vehicle through a removable socket plug connector 120. Connections to the previously described vehicle components and the light emitting diode 92 are made with conducting lines 122. The components of the present invention less the relay K1 are emplaced on a standard circuit card assembly 124 and encased in a rigid plastic or metal housing 126. The housing 126 is securable to a vehicle via use of integral eyelets 128, through which bolts or screws can be disposed. Relay K1 is coupled to the housing 126 through use of a rigid bracket 130, bolt 132, and nut 134.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims.

What is claimed as being new and desired to be protected by Letters Patent of the United States is as follows:

1. A vehicle ignition-disabling anti-car jacking device comprising, in combination:

a vehicle having an ignition coil operatively coupled with an engine;

an electronic ignition system coupled to an electric power supply and actuated by a hand-held removable key such that the removable key forms a stable ground when inserted within the electronic ignition system of the vehicle;

a passenger compartment with a control panel thereadjacent which includes monitoring gauges that allow a driver to monitor the status of vehicle operations;

a driver's door for allowing a driver access to the passenger compartment;

an electrically energized and openable electronic driver's door switch that is responsive to opening and closing of the driver's door, the door switch being formed of a pin switch;

relay means coupled between the ignition coil and the ignition system of the vehicle, the relay means being enabled for electrically energizing the ignition coil when the ignition system is activated with the key and further being disabled for de-energizing the ignition coil when the ignition system is deactivated with the key, the relay means formed of a single pole single throw relay coupled to and in electrical communication with a stabilizing diode, the relay having a pair of normally closed relay contacts coupled between the ignition coil and the ignition system of the vehicle;

first timer means for transmitting an electric first switching signal after a first predetermined period of time of approximately 30 seconds when electrically activated by the enabled relay means, the first timer means formed of a series interconnection of a first resistor and a second resistor that are coupled to a first charging capacitor, the first timer means further including an input power regulator formed of a zener diode coupled between the first resistor and the second resistor and a ground whereby the zener diode ensures that a constant 12 volt power input is applied to the first charging capacitor, the first timer means comprising a first output resistor and a first discharge enabling diode connected to the first capacitor;

second timer means for transmitting an electric second switching signal after a second predetermined period of time of approximately 10 seconds, the second timer means formed of third resistor interconnected with a second charging capacitor, a second output resistor and a second discharge enabling diode connected to the second charging capacitor;

first switching means coupled between the first timer means and the second timer means and responsive to receipt of the first switching signal from the first timer means for electrically activating the second timer means, the first switching means including a first silicon-controlled rectifier which is biased by a resistive network formed of a fourth resistor, a fifth resistor, and a sixth resistor;

second switching means coupled between the second timer means and the relay means, the second switching means being responsive to the receipt of the second switching signal from the second timer means for disabling the relay means by precluding the transmission of energy to a coil of the relay means and for further enabling the relay means when the second switching signal is not received, the second switching means including a silicon-controlled rectifier and a stabilization network formed of a third capacitor and a seventh resistor;

manually-operated third switching means coupled to the relay means, the first timer means, and the second timer means, the third switching means being activated in response to a manual application of an external grounding contact applied thereto by a driver of the vehicle for deactivating the first timer means and the second timer means and thereby precluding the relay means from being disabled, the third switching means including a third silicon-controlled rectifier, a stabilization network formed of a fourth capacitor and a eighth resistor which is biased by a first transistor, and a level resistor coupled between the third silicon-control rectifier and the first transistor;

said third switching means including a ninth resistor coupled to a base of the first transistor and a parallel combination of a fifth capacitor and a tenth resistor coupled to an emitter of the first transistor, whereby the application of a driver's finger to a screw which is connected to the tenth resistor activates the third switching means;

lamp means comprising a green light emitting diode coupled to the third silicon-controlled rectifier of the third switching means and a indicator panel of the vehicle for providing a visual warning that the third switching means has been activated, thereby indicating that the device has been disarmed;

alarm means comprising a piezoelectric buzzer coupled between first timer means and the first switching means, the alarm means being activated in response to receipt of the first switching signal from the first timer means for providing an audible warning prior to activation of the second timer means and subsequent disabling of the relay means; and door switch interface means coupled to the first timer means, the second timer means, and the third switching means and securable to the door switch on the driver's door of the vehicle, the door switch interface means being activated in response to opening of the driver's door for disabling the third switching means and thereby allowing the relay means to be disabled, the door switch interface means comprising a second transistor whose collector is connected to the third silicon-controlled rectifier of the third switching means;

said first switching means further including a third transistor with a eleventh resistor for disabling the alarm means after the disabling of the relay means thereby rendering the alarm means difficult to find.

* * * * *